(12) United States Patent
Shin et al.

(10) Patent No.: US 9,734,827 B2
(45) Date of Patent: Aug. 15, 2017

(54) ELECTRIC EQUIPMENT AND CONTROL METHOD THEREOF

(71) Applicant: SAMSUNG ELECTRONICS CO., LTD., Suwon-si (KR)

(72) Inventors: Jin Chul Shin, Suwon-si (KR); Jong Woon Park, Hwaseong-si (KR); Keon Ho Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 292 days.

(21) Appl. No.: 14/327,856

(22) Filed: Jul. 10, 2014

(65) Prior Publication Data

US 2015/0019215 A1 Jan. 15, 2015

(30) Foreign Application Priority Data

Jul. 11, 2013 (KR) .......................... 10-2013-0081295

(51) Int. Cl.
*G10L 15/20* (2006.01)
*G10L 15/22* (2006.01)
*G10L 15/26* (2006.01)
*G10K 11/175* (2006.01)
*G10K 11/16* (2006.01)
*G10L 15/01* (2013.01)
*G10L 21/0208* (2013.01)

(52) U.S. Cl.
CPC .............. *G10L 15/20* (2013.01); *G10K 11/16* (2013.01); *G10K 11/175* (2013.01); *G10L 15/01* (2013.01); *G10L 15/26* (2013.01); *G10L 21/0208* (2013.01); *G10L 2015/223* (2013.01)

(58) Field of Classification Search
CPC ... G10L 15/22; G10L 15/20; G10L 2015/223; G10L 21/0208; H04N 21/42203; F24F 2011/0053; F25B 2500/12; G01C 21/3608; G01C 21/3629; G06F 3/167; G08C 2201/31; H04W 4/00
See application file for complete search history.

(56) References Cited

U.S. PATENT DOCUMENTS

| 2006/0028337 | A1* | 2/2006 | Li ........................ | G08C 17/00 340/539.1 |
| 2006/0046769 | A1* | 3/2006 | Arun ................... | H04M 1/2725 455/550.1 |
| 2007/0005350 | A1* | 1/2007 | Amada ...................... | 704/211 |
| 2007/0192101 | A1* | 8/2007 | Braho .................. | G10L 15/065 704/251 |

(Continued)

*Primary Examiner* — Douglas Godbold
*Assistant Examiner* — Mark Villena
(74) *Attorney, Agent, or Firm* — Staas & Halsey LLP

(57) ABSTRACT

An electric equipment including a communication unit to communicate with at least one electric equipment in a predetermined space through a network, a sound collection unit to collect sound in the predetermined space, a voice recognition unit to recognize a voice from the collected sound, and a controller to transmit a noise reduction control signal to the at least one electric equipment when the recognized voice is an operation command. Voice recognition is performed in a state in which surrounding noise is reduced, thereby improving performance of the voice recognition and thus improving operational accuracy of an electric equipment. In addition, a voice recognition rate is increased, thereby improving user satisfaction.

36 Claims, 10 Drawing Sheets

(56) References Cited

U.S. PATENT DOCUMENTS

| | | | | |
|---|---|---|---|---|
| 2008/0071547 A1* | 3/2008 | Prieto | .................... | B60N 2/002 |
| | | | | 704/275 |
| 2008/0089529 A1* | 4/2008 | Klossowski | ........... | G10K 11/16 |
| | | | | 381/71.13 |
| 2008/0238607 A1* | 10/2008 | Schuricht | ................ | F01P 7/044 |
| | | | | 340/3.1 |
| 2010/0088093 A1* | 4/2010 | Lee | ......................... | G10L 15/22 |
| | | | | 704/233 |
| 2013/0010974 A1* | 1/2013 | Nakadai | .............. | G10L 21/0208 |
| | | | | 381/56 |
| 2013/0102295 A1* | 4/2013 | Burke | ................... | H04L 67/125 |
| | | | | 455/414.4 |
| 2013/0167565 A1* | 7/2013 | Kim | ........................ | F25D 29/00 |
| | | | | 62/89 |
| 2013/0238326 A1* | 9/2013 | Kim | ........................ | G06F 3/167 |
| | | | | 704/231 |
| 2013/0312439 A1* | 11/2013 | Howell | ................... | F25D 29/00 |
| | | | | 62/89 |
| 2013/0332159 A1* | 12/2013 | Federighi | ................ | G06F 1/206 |
| | | | | 704/235 |
| 2014/0267933 A1* | 9/2014 | Young | .............. | H04N 21/42203 |
| | | | | 348/734 |
| 2014/0330435 A1* | 11/2014 | Stoner | ................... | F24F 11/001 |
| | | | | 700/275 |

\* cited by examiner

FIG. 6

| | AIR CONDITIONER | TELEVISION | CLEANING ROBOT | KITCHEN HOOD |
|---|---|---|---|---|
| OPERATION | | O | O | X |
| OPERATION RATE (INITIAL OPERATION RATE) | | 100% | 100% | X |
| REDUCTION RATE APPLIED (FINAL OPERATION RATE) | | 50% | 50% | X |

FIG. 7

|  | AIR CONDITIONER | TELEVISION | CLEANING ROBOT | KITCHEN HOOD |
|---|---|---|---|---|
| OPERATION |  | O | O | X |
| OPERATION RATE |  | 100% | 100% | X |
| FIRST REDUCTION RATE APPLIED (FIRST OPERATION RATE) |  | 70% | 70% | X |
| SECOND REDUCTION RATE APPLIED (SECOND OPERATION RATE) |  | 52.5% | 52.5% | X |
| N-TH REDUCTION RATE APPLIED (N-TH OPERATION RATE) |  | ... | ... | X |
| FINAL OPERATION RATE |  | off | off | X |

FIG. 8

|  | AIR CONDITIONER | TELEVISION | CLEANING ROBOT | KITCHEN HOOD |
|---|---|---|---|---|
| OPERATION |  | O | O | O |
| NOISE LEVEL | TARGET: 60<br>AVERAGE: 70 | 50 | 80 | 75 |
| REDUCTION RATE |  | 0% | 25% | 20% |

FIG. 9

|  | AIR CONDITIONER | TELEVISION | CLEANING ROBOT | KITCHEN HOOD |
|---|---|---|---|---|
| OPERATION |  | O | O | O |
| NOISE LEVEL | TARGET: 60 AVERAGE: 70 | 50 | 80 | 75 |
| REDUCTION RATE |  | 0% | 25% | 20% |
| FIRST ADDITIONAL REDUCTION RATE |  | 5% | 5% | 5% |
| SECOND ADDITIONAL REDUCTION RATE |  | 5% | 5% | 5% |
| N-TH ADDITIONAL REDUCTION RATE |  | 5% | 5% | 5% |

ELECTRIC EQUIPMENT AND CONTROL METHOD THEREOF

CROSS-REFERENCE TO RELATED APPLICATIONS

This application claims the benefit of Korean Patent Application No. 2013-0081295, filed on Jul. 11, 2013 in the Korean Intellectual Property Office, the disclosure of which is incorporated herein by reference.

BACKGROUND

1. Field

Embodiments of the present disclosure relate to an electric equipment that performs voice recognition and a control method thereof.

2. Description of the Related Art

In recent years, attempts to operate electronic products frequently used for daily life using a voice command have been made in various fields.

Particularly, a washer and a dishwasher reduce housework to provide living convenience and a television and an audio system occupy important positions in leisure, information collection, education, etc.

In addition, a remote controller is used to improve operational convenience. As a result, a user may perform desired operation using a hand while being seated.

However, such operation may cause operation of other equipments, which may restrict convenience. For this reason, an apparatus that is capable of recognizing a human voice is under development.

A voice recognition principle is as follows.

First, a voice recognition algorithm may mainly include a voice section detection process, a feature extraction process, and a matching process.

When a voice signal is input through a microphone, an analog/digital (A/D) converter converts the voice signal into a digital signal. The digital signal is output to a voice section detection unit.

The voice section detection unit divides the digital voice signal into short-section signals (i.e. frames), detects only a real voice section from the input signal using energy of each frame, a zero crossing rate, and time length information, and outputs the detected voice section to a feature extraction unit.

The feature extraction unit extracts a feature of a frame corresponding to the voice section to form a test pattern of the input voice and outputs the test pattern to a matching unit.

The matching unit compares the test pattern with reference patterns stored in a memory for reference data to output a reference pattern most similar to the test pattern to the recognized voice.

A reference pattern of a voice signal is stored in the memory for reference data as follows. The feature extraction unit extracts a feature of a frame corresponding to a voice section to form a reference pattern and stores the reference pattern in the memory for reference data. This process is repeatedly performed on voice signals to be recognized and obtained reference patterns are stored in the memory for reference data as a database.

In the conventional voice recognition method as described above, the voice section is extracted using information, such as short-section energy of a signal and a zero crossing rate.

These features indicate features of a signal in a time domain. Since complex calculation is not necessary, the features may be rapidly and conveniently used.

In a case in which voice recognition is applied to a washer, a performance in extracting a voice section using short-section energy of a signal or a zero crossing rate is lowered because surrounding noise and sound are great due to driving of a motor of the washer and water supply when a voice command to change a function is input during operation, e.g. washing, of the washer.

Consequently, a voice section extraction algorithm based on a new method using new features excluding energy and a zero crossing rate to stably extract a voice section regardless of surrounding noise and sound may be necessary.

SUMMARY

It is an aspect of the present disclosure to provide an electric equipment that controls operation of another electric equipment that is operating to reduce noise generated from the another electric equipment when a voice command is input and a control method thereof.

It is another aspect of the present disclosure to provide an electric equipment that reduces an operation rate of a load generating noise upon receiving an operation control signal from another electric equipment and a control method thereof.

It is a further aspect of the present disclosure to provide an electric equipment that controls operation of another electric equipment generating noise when a recognized voice includes noise and controls operation of the another electric equipment step by step based on a voice re-recognition result.

Additional aspects of the disclosure will be set forth in part in the description which follows and, in part, will be obvious from the description, or may be learned by practice of the disclosure.

In accordance with an aspect of the present disclosure, an electric equipment includes a communication unit to communicate with at least one electric equipment in a predetermined space through a network, a sound collection unit to collect sound in the predetermined space, a voice recognition unit to recognize a voice from the collected sound, and a controller to transmit a noise reduction control signal to the at least one electric equipment when the recognized voice is an operation command.

The operation command may include a magic word indicating start of voice recognition.

The operation command may include a control word to manipulate a current operation mode.

The controller may control an operation rate of 100% through 0% of the at least one electric equipment.

The controller may reduce an operation rate of the at least one electric equipment by a predetermined reduction rate.

The controller may reduce the operation rate of the at least one electric equipment step by step until a level of sound around the sound collection unit is less than a reference sound level.

The controller may reduce the operation rate of the at least one electric equipment step by step until a recognition rate of the voice is greater than a reference recognition rate.

The controller may check electric equipments that are operating, requests noise levels from the checked electric equipments, average the received noise levels of the electric equipments to calculate an average noise level, and, when the calculated average noise level is greater than a target noise level, reduce operation rates of electric equipments having noise levels greater than the target noise level among the checked electric equipments.

The controller may reduce the operation rates of the electric equipments that are operating by a predetermined reduction rate when a recognition rate of the voice is equal to or less than a reference recognition rate.

The controller may transmit a restoration control signal to the at least one electric equipment when a recognition rate of the voice is greater than a reference recognition rate.

In accordance with another aspect of the present disclosure, an electric equipment includes a load generating noise, a communication unit to communicate an electric equipment performing voice recognition through a network, and a controller to reduce an operation rate of the load upon receiving a noise reduction control signal from the electric equipment performing voice recognition.

The noise reduction control signal may include a reduction rate to reduce the operation rate of the load.

The electric equipment may further include a sound collection unit to collect sound in a predetermined space and a voice recognition unit to recognize a voice from the collected sound, wherein, when the recognized voice is an operation command, the controller may control operation of the load in response to the operation command.

The electric equipment may further include a storage unit to store a reduction rate corresponding to the number of times of receiving the noise reduction control signal.

The load may include any one selected from between a fan and a speaker.

The electric equipment may further include a storage unit to store an operation rate of the load during operation before the noise reduction control signal is received, wherein the controller may restore the operation rate of the load upon receiving a restoration control signal from the electric equipment performing voice recognition.

In accordance with another aspect of the present disclosure, a control method of an electric equipment communicating with at least one electric equipment in a predetermined space through a network includes collecting sound in the predetermined space, recognizing a voice from the collected sound, transmitting a noise reduction control signal to the at least one electric equipment when the recognized voice is an operation command, outputting information to re-request the voice command, recollecting sound in the predetermined space, re-recognizing a voice from the recollected sound, and, when the re-recognized voice is an operation command, performing operation corresponding to the operation command.

The recognizing the voice from the collected sound may include recognizing a magic word indicating start of voice recognition.

The re-recognizing the voice from the recollected sound may include recognizing a control word to manipulate a current operation mode.

The transmitting the noise reduction control signal to the at least one electric equipment may include transmitting a reduction control signal for an operation rate of 100% through 0% to the at least one electric equipment.

The transmitting the noise reduction control signal to the at least one electric equipment may include transmitting a reduction rate reduction control signal to the at least one electric equipment.

The transmitting the noise reduction control signal to the at least one electric equipment may include checking a level of sound around the sound collection unit and transmitting the noise reduction control signal when the checked sound level is equal to or greater than a reference sound level.

The control method may further include checking a level of the recollected sound, transmitting an operation reduction rate to the noise reduction control signal when the checked sound level is equal to or greater than the reference sound level, and outputting information to re-request the voice command.

The transmitting the operation reduction rate to the noise reduction control signal may include outputting information to re-request the voice command until the checked sound level is less than the reference sound level and reducing an operation rate of the at least one electric equipment step by step based on the number of times of re-requesting the voice command.

The transmitting the noise reduction control signal to the at least one electric equipment may include checking whether a recognition rate of the voice is equal to or less than a reference recognition rate and transmitting the noise reduction control signal when the recognition rate of the voice is equal to or less than the reference recognition rate.

The control method may further include checking a recognition rate of the re-recognized voice, transmitting an operation reduction rate to the noise reduction control signal when the checked recognition rate is equal to or less than the reference recognition rate, and outputting information to re-request the voice command.

The transmitting the operation reduction rate to the noise reduction control signal may include outputting information to re-request the voice command until the checked recognition rate is greater than the reference recognition rate and reducing an operation rate of the at least one electric equipment step by step based on the number of times of re-requesting the voice command.

The transmitting the operation reduction rate to the noise reduction control signal may include checking electric equipments that are operating, requesting noise levels from the checked electric equipments, averaging the received noise levels of the electric equipments to calculate an average noise level, and, when the calculated average noise level is greater than a target noise level, reducing operation rates of electric equipments having noise levels greater than the target noise level among the checked electric equipments.

The control method may further include reducing the operation rates of the electric equipments that are operating by a predetermined reduction rate when a recognition rate of the voice is equal to or less than a reference recognition rate.

The control method may further include transmitting a restoration control signal to the at least one electric equipment when a recognition rate of the voice is greater than a reference recognition rate.

In accordance with a further aspect of the present disclosure, a control method of an electric equipment communicating with an electric equipment performing voice recognition through a network includes operating a load when an operation command is input, reducing an operation rate of the load upon receiving a noise reduction control signal from the electric equipment performing voice recognition during operation of the load, storing an operation rate of the load during operation before the noise reduction control signal is received, and restoring the operation rate of the load to the stored operation rate upon receiving a restoration control signal from the electric equipment performing voice recognition.

The noise reduction control signal may include a reduction rate to reduce the operation rate of the load.

The control method may further include collecting sound in a predetermined space, recognizing a voice from the collected sound, and, when the recognized voice is an operation command, controlling operation of the load in response to the operation command.

The reducing the operation rate of the load may include checking the number of times of receiving the noise reduction control signal and reducing the operation rate step by step in response to the checked number of times of receiving the noise reduction control signal.

The reducing the operation rate step by step may include varying reduction rates at the respective steps.

In another aspect, an electric equipment may include a voice recognition unit to receive a voice command, a controller to determine which of a plurality of electric equipments on a network are operating and to determine which operating electric equipments of the plurality of electric equipments should receive a noise reduction control signal based on the voice command, and a communication unit to transmit the noise reduction control signal to the determined operating electric equipments.

In yet another aspect, a voice recognition system may include a first electric equipment, and a second electric equipment connected to the first electric equipment by way of a network. The second electric equipment may receive a voice command, determine whether the first electric equipment is operating and determine whether the first electric equipment and the second electric equipment should receive a noise reduction signal based on the voice command. The second electric equipment may perform at least one of transmitting the noise reduction signal to the first electric equipment and reducing noise on the second electric equipment based on the determination of the voice command.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 6 to 9 are illustrative views showing that the electric equipment belonging to the first group according to the embodiment of the present disclosure controls operations of other electric equipments.

DETAILED DESCRIPTION

Figure 1:
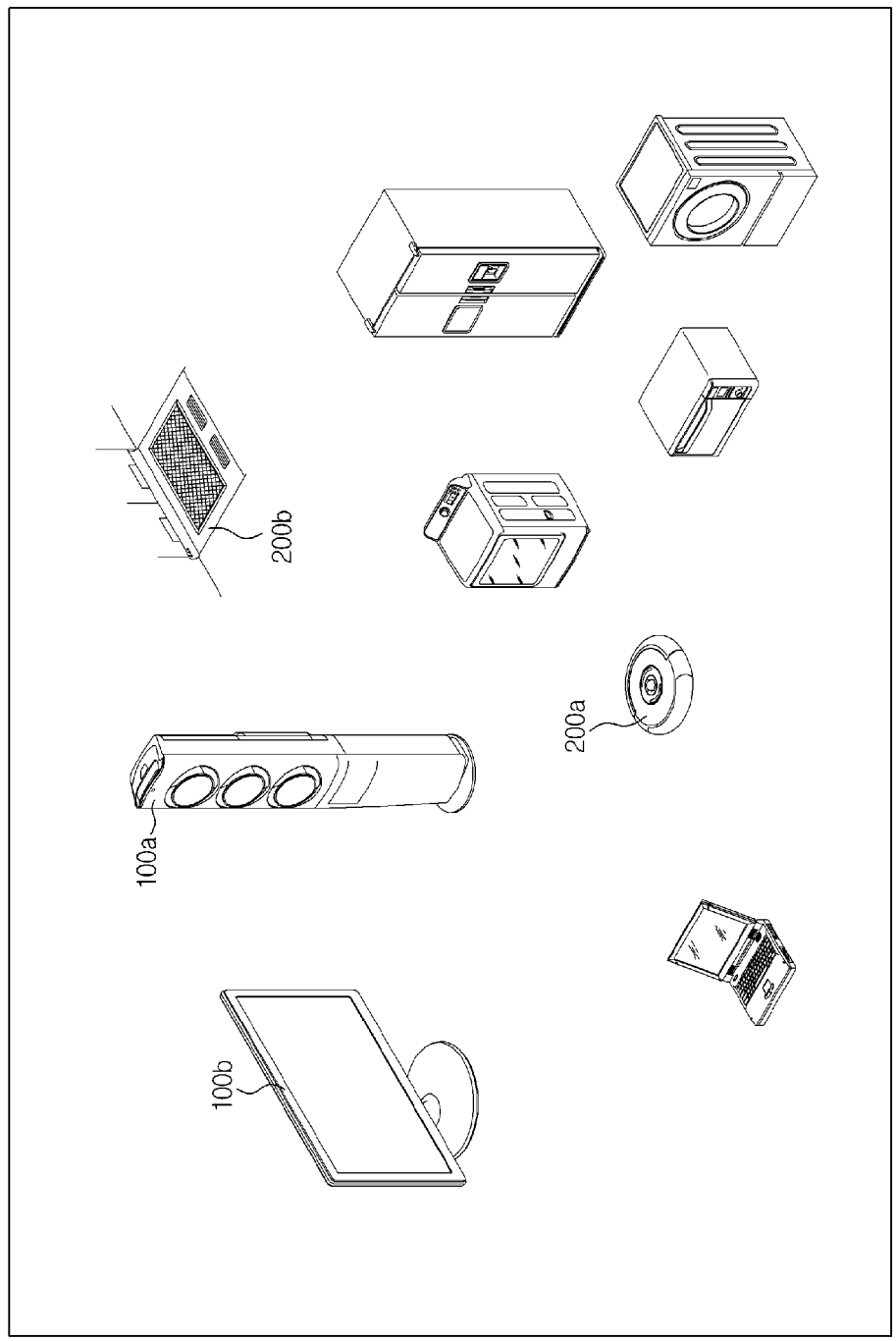
FIG. 1 is an illustrative view showing a home network system including electric equipments according to an embodiment of the present disclosure.

Reference will now be made in detail to the embodiments of the present disclosure, examples of which are illustrated in the accompanying drawings, wherein like reference numerals refer to like elements throughout.

Figure 2:
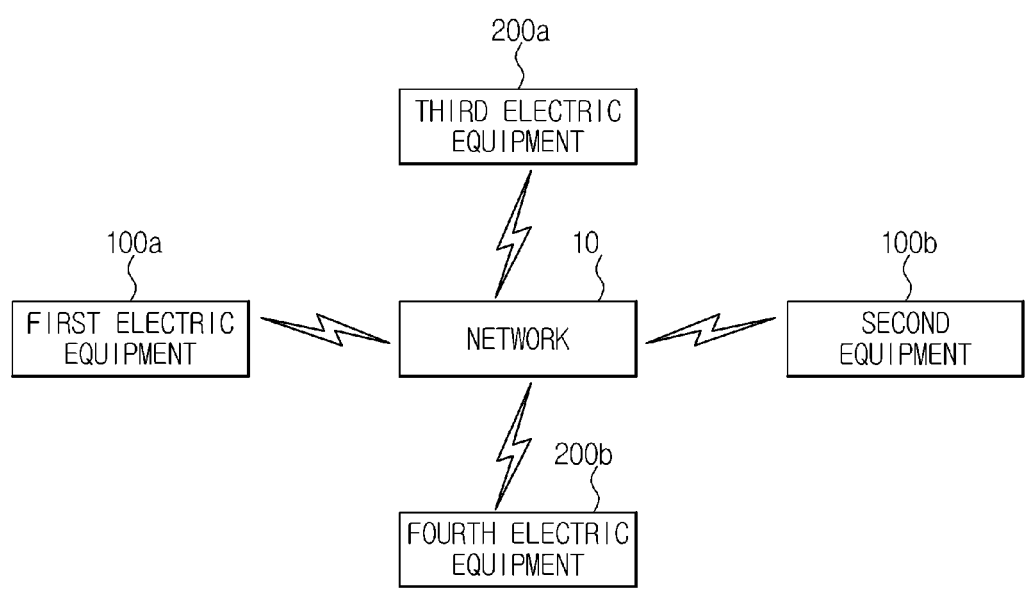
FIG. 2 is a control block diagram of the home network system including the electric equipments according to the embodiment of the present disclosure.

FIG. 1 is an illustrative view showing a home network system including electric equipments according to an embodiment of the present disclosure and FIG. 2 is a control block diagram of the home network system including the electric equipments according to the embodiment of the present disclosure. The home network system includes a network 10 and a plurality of electric equipments 100a, 100b, 200a, and 200b.

The network 10 is a home network, through which all electric and electronic equipments used in the home are connected to each other in a wired or wireless fashion to perform two-way communication.

More specifically, a refrigerator, an air conditioner, a television, a kitchen hood, and a cleaning robot are connected to each other through the network 10, e.g. the wired or wireless Internet. In addition, a washer, a cooker, and a dishwasher are also connected to each other through the network 10.

Information is shared between the respective electric equipments through the network 10.

In-home transmission methods are classified into a wired in-home transmission method and a wireless in-home transmission method. Representative examples of the wired in-home transmission method may include home phone line networking alliance (PNA) using an existing telephone cable, IEEE 1394, and a power cable. Representative examples of the wireless in-home transmission method may include home radio frequency (RF), Bluetooth, infrared data association (IrDA), and wireless LAN (WiFi).

The electric equipments 100a, 100b, 200a, and 200b communicate with each other through the network 10.

The electric equipments include first group electric equipments 100a and 100b that are capable of performing voice recognition and second group electric equipments 200a and 200b that are not capable of performing voice recognition.

The first group electric equipments are equipments that recognize a voice and operate a load based on the recognized voice. Upon recognizing a magic word indicating start of voice recognition, a first group electric equipment transmits an operation change signal to another first group electric equipment and a second group electric equipment in order to change operations of the another first group electric equipment and the second group electric equipment.

Upon receiving the operation change signal from the first group electric equipment that is recognizing a voice, the first group electric equipment to which a voice command has not been input may change operation of a load to reduce noise.

Upon receiving the operation change signal from at least one of the first group electric equipments, the second group electric equipment may change operation of a load to reduce noise.

Changing the operation of the load includes reducing an operation rate of the load to reduce noise. For example, changing the operation of the load may include reducing the number of rotations of a fan or reducing volume of a speaker.

The electric equipments are installed in a predetermined space, e.g. in the home, to provide a comfortable environment. The electric equipments include at least two selected from among an air conditioner, a television, a kitchen hood, a cleaning robot, an audio system, a washer, a cooker, and a dishwasher.

Figure 3:
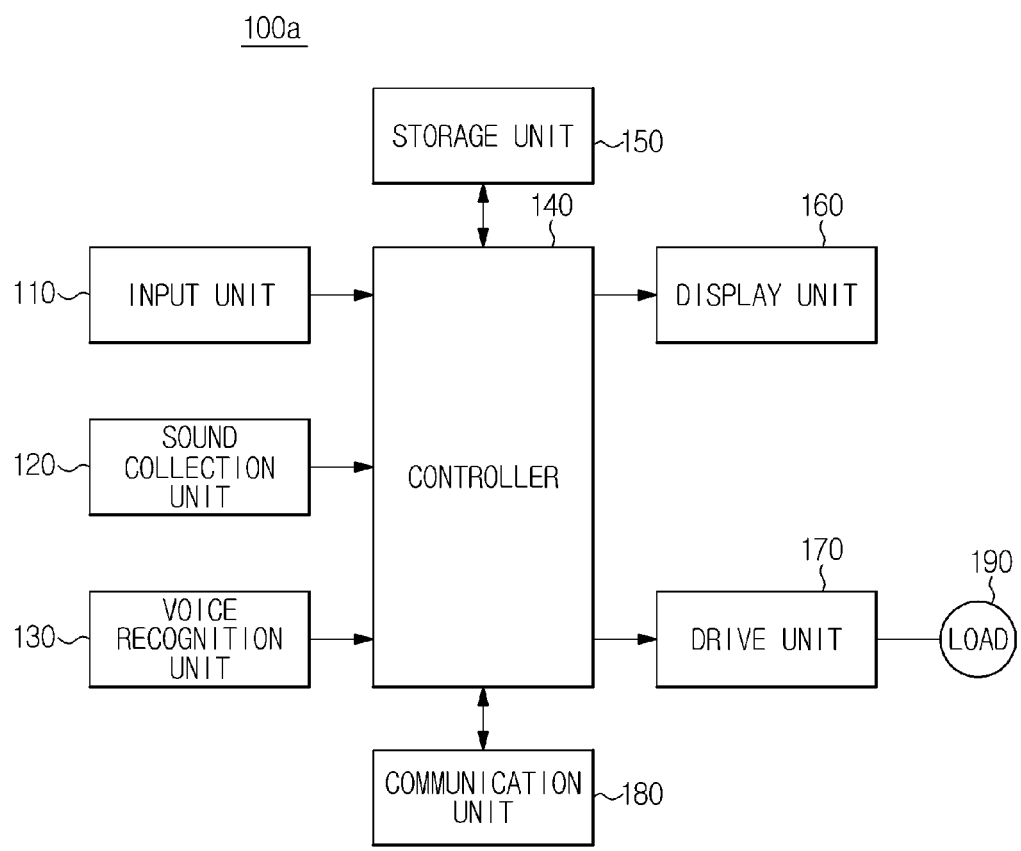
FIG. 3 is a control block diagram of an electric equipment belonging to a first group according to another embodiment of the present disclosure.

FIG. 3 is a control block diagram of an electric equipment belonging to a first group according to another embodiment of the present disclosure.

On the assumption that a plurality of electric equipments belonging to the first group includes a first electric equipment and a second electric equipment, the first electric equipment and the second electric equipment have the same control configuration.

That is, the first electric equipment and the second electric equipment recognize a voice and control a load and operation of another electric equipment according to a voice recognition result. To this end, the first electric equipment and the second electric equipment have the same control configuration. Hereinafter, the control configuration of the first electric equipment will be described.

The electric equipment 100a includes an input unit 110, a sound collection unit 120, a voice recognition unit 130, a controller 140, a storage unit 150, a display unit 160, a drive unit 170, a communication unit 180, and a load 190.

The input unit 110 allows input of a power on/off command, an operation command to manipulate an operation state, etc. and transmits input information to the controller 140.

The input unit 110 may include a rejection (refusal) button to reject operation control when an operation control command from another electric equipment is input. The rejection button may be selected by a user.

The sound collection unit 120 collects sound in a predetermined space and transmits a signal corresponding to the collected sound to the controller 140. The sound collection unit 120 includes a microphone or a microphone array constituted by a plurality of microphones.

The voice recognition unit 130 receives a signal corresponding to the sound collected by the sound collection unit 120, recognizes a voice from the received sound signal, and transmits recognized voice information to the controller 140.

The controller 140 controls operation of the load 190 based on the command input through the input unit 110 or the operation command recognized through the voice recognition.

The voice information for the operation command includes a magic word indicating start of voice recognition and a control word to manipulate operation.

Upon recognizing the voice, the controller 140 checks electric equipments that are operating and controls operation of at least one of the checked electric equipments to reduce surrounding noise for improvement of a voice recognition rate.

The controller 140 may control, e.g. change, an operation rate of an internal load in addition to the other electric equipments.

Controlling operation of at least one electric equipment that is operating includes reducing an operation rate of a load generating noise to reduce the noise.

A condition to control operation of at least one electric equipment that is operating includes any one of the following conditions.

(Condition 1) Upon recognizing a magic word or a control word, the controller 140 transmits an operation control signal to reduce an operation rate to at least one electric equipment that is operating to reduce the operation rate of the at least one electric equipment that is operating.

(Condition 2) When a level of sound collected around the sound collection unit is equal to or greater than a reference sound level, the controller 140 transmits an operation control signal to reduce an operation rate to at least one electric equipment that is operating. When the sound level is less than the reference sound level, operation of at least one electric equipment that is operating may be maintained.

(Condition 3) When a recognition rate of the recognized magic word is equal to or less than a reference recognition rate, the controller 140 transmits an operation control signal to reduce an operation rate to at least one electric equipment that is operating. When the recognition rate of the recognized magic word is greater than the reference recognition rate, operation of at least one electric equipment that is operating may be maintained.

An operation control configuration of an electric equipment to reduce an operation rate of another electric equipment that is operating includes any one of the following operation control configurations.

In one configuration, the controller 140 transmits an operation control signal to all electric equipments that are operating to control operation of the electric equipments. At this time, a predetermined reduction rate is transmitted to the operation control signal to reduce an operation rate of the electric equipments.

That is, the controller 140 commands all electric equipments connected through the network to reduce an operation rate by the predetermined reduction rate.

All the electric equipments connected through the network include electric equipments having loads generating noise.

In another configuration, after primarily controlling the operation of all the electric equipments that are operating as described above, the controller 140 re-requests a voice command from the user and further controls the operations of all the electric equipments based on the re-request result.

At this time, the controller 140 transmits the predetermined reduction rate to the operation control signal to further reduce the operation rate of all the electric equipments.

When controlling to reduce the operation rate of all the electric equipments, the controller 140 further performs reduction control based on the predetermined reduction rate as the number of times of re-requesting the voice command is increased.

Control to reduce the operation rate based on the predetermined reduction rate is performed as follows.

The operation rate of all the electric equipments is reduced based on a first reduction rate for first reduction, is reduced based on a second reduction rate for second reduction, and is reduced based on a third reduction rate for third reduction. In addition, the operation rate of all the electric equipments is reduced based on an n-th reduction rate for n-th reduction. At the last operation, the operation of all the electric equipments is turned off. The first reduction rate to the n-th reduction rate may be the same as or different from one another.

In yet another configuration, the controller 140 transmits an operation control signal to all electric equipments that are operating to control operation of the electric equipments. At this time, an average sound level is acquired and the acquired average sound level is compared with a target sound level. When the acquired average sound level is greater than the target sound level, the controller 140 checks an electric equipment generating noise greater than the target sound level and controls operation of the checked electric equipment. When the acquired average sound level is less than the target sound level, the operation of the electric equipments is maintained.

Acquiring the average sound level includes receiving sound levels from other electric equipments that are operating and averaging the received sound levels.

In addition, the sound levels received from the other electric equipments may be levels set based on the operation rate of the respective electric equipments or levels detected through sensors provided at the respective electric equipments.

When controlling the operation of the electric equipment generating noise greater than the target sound level, the controller 140 compares the sound levels of the respective electric equipments with the target sound level, calculates a level difference per the electric equipment, calculates a reduction rate of the respective electric equipments based on the calculated level difference per the electric equipment and the sound levels of the respective electric equipments, and transmits the calculated reduction rate of the respective electric equipments to the respective electric equipments as an operation control signal.

In still another configuration, after primarily controlling the operation of all the electric equipments that are operating by acquiring the average sound level as described above, the controller 140 transmits an operation control signal to all the electric equipments to further control the operation of all the electric equipments based on the sound collection result. At this time, the predetermined reduction rate is transmitted to the operation control signal to further reduce an operation rate of all the electric equipments.

When controlling to reduce the operation rate of all the electric equipments, the controller 140 further performs reduction control based on the predetermined reduction rate as the number of times of re-requesting the voice command is increased.

In yet another configuration, the controller transmits an operation control signal to all the electric equipments that are operating based on priority. At this time, the predetermined reduction rate is transmitted to the operation control signal to reduce an operation rate of an electric equipment having the highest priority.

In still another configuration, after primarily controlling the operation of the electric equipments that are operating based on priority as described above, the controller 140 transmits an operation control signal to at least one electric equipment that is operating to further reduce an operation rate of the at least one electric equipment based on the sound collection result. At this time, the predetermined reduction rate is transmitted to an electric equipment having second priority as the operation control signal.

That is, the controller 140 transmits the predetermined reduction rate to an electric equipment having the next priority as the operation control signal as the number of times of re-requesting the voice command is increased.

In yet another configuration, after primarily controlling the operation of the electric equipments that are operating based on priority as described above, the controller 140 further controls the operation rate of the electric equipment having the highest priority based on the sound collection result. At this time, the controller 140 further transmits the reduction rate as the number of times of re-requesting the voice command is increased.

The priority of the electric equipments may be decided in order of a sound level during operation.

When transmitting an operation control signal to another electric equipment, the controller 140 may transmit only a noise reduction control signal to the operation control signal without transmission of a reduction rate to the operation control signal. That is, the controller 140 may directly control an operation rate of a load of the another electric equipment.

In addition, the controller 140 may have location information of the electric equipments in the home and, when recognizing a voice, control operation of electric equipments adjacent to the controller based on the location information of the electric equipments.

Upon completion of voice recognition, the controller 140 transmits a restoration control signal to the electric equipment to which the operation control signal have been transmitted.

When the user pushes the rejection button, the controller 140 may control the load such that a current operation state is maintained even when an operation control command from another electric equipment is received.

The storage unit 150 stores reference voice information.

The storage unit 150 stores a reduction rate when an operation control signal is transmitted to another electric equipment. At this time, the storage unit 150 may store the reduction rate based on the number of times of re-requesting a voice command.

The storage unit 150 may store at least one selected from between a reference sound level and a reference recognition rate as reference information.

The display unit 160 displays operation information. In addition, the display unit 160 may display information about re-request of a voice command.

The drive unit 170 drives the load 190 according to a command of the controller 140.

The communication unit 180 communicates with another electric equipment connected through the network according to a command of the controller 140.

The communication unit 180 transmits a reduction rate to reduce an operation rate to other first and second group electric equipments and receives an operation reduction rate of the load, which is an operation control signal, from another first group electric equipment.

The load 190 is a component provided in the first electric equipment to perform unique and additional functions of the first electric equipment. In this embodiment, a component generating noise among a plurality of components is an object to be controlled.

For example, in a case in which the first electric equipment is an air conditioner, the load includes a compressor, a valve, and a fan. In this embodiment, the fan is an object to be controlled.

On the other hand, in a case in which the second electric equipment is a television, the load includes a video driving module and a speaker. In this embodiment, the speaker is an object to be controlled.

Figure 4:
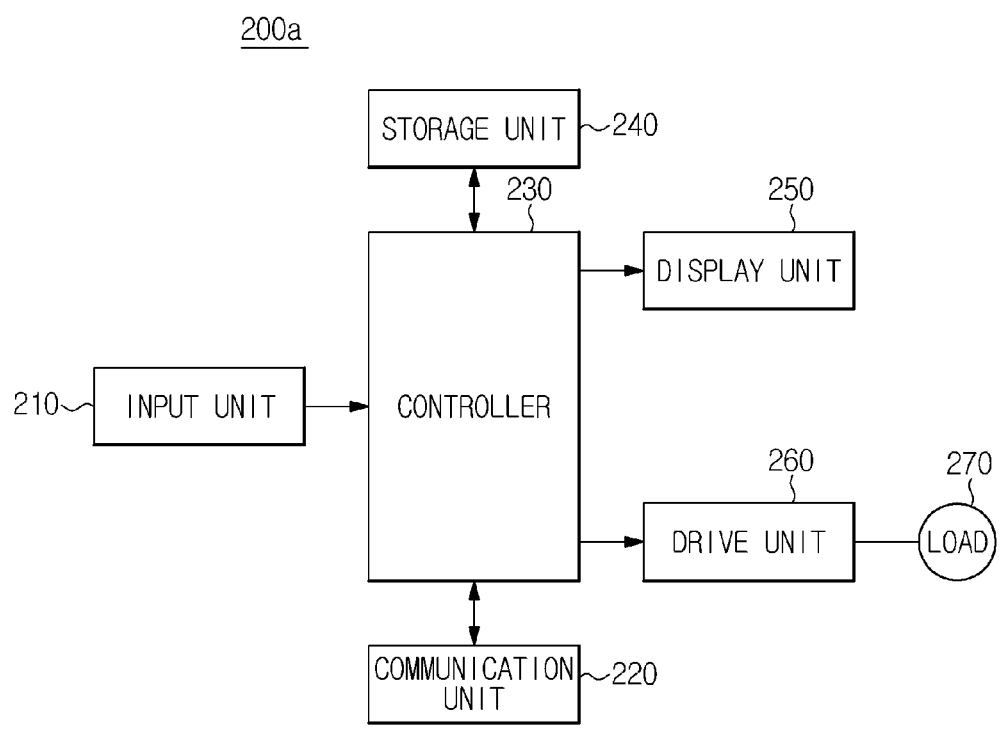
FIG. 4 is a control block diagram of an electric equipment belonging to a second group according to another embodiment of the present disclosure.

FIG. 4 is a control block diagram of an electric equipment belonging to a second group according to another embodiment of the present disclosure On the assumption that a plurality of electric equipments belonging to the second group includes a third electric equipment and a fourth electric equipment, the third electric equipment and the fourth electric equipment have the same control configuration.

That is, the third electric equipment 200*a* and the fourth electric equipment 200*b* operate according to a user command. Upon receiving an operation control signal from the first group electric equipment when the first group electric equipment performs voice recognition, the third electric equipment and the fourth electric equipment control, e.g. change, operation of a load generating noise. Upon completion of the voice recognition performed by the first group electric equipment, the third electric equipment and the fourth electric equipment control, e.g. restore, the operation of the load.

The electric equipments belonging to the second group have the same control configuration. Hereinafter, the control configuration of the third electric equipment 200a will be described.

The electric equipment 200a belonging to the second group includes an input unit 210, a communication unit 220, a controller 230, a storage unit 240, a display unit 250, a drive unit 260, and a load 270.

The input unit 210 allows input of a power on/off command and an operation command and transmits input information to the controller 230.

The communication unit 220 may perform wired/wireless communication. The communication unit 220 communicates with a first group electric equipment according to a command of the controller 230.

The communication unit 220 receives an operation control signal and a restoration control signal from the first group electric equipment and transmits the received operation control signal and restoration control signal to the controller 230.

The communication unit 220 may transmit a sound level to a first group electric equipment that is recognizing a voice.

Upon receiving an operation control signal from the first group electric equipment that is recognizing the voice, the controller 230 controls, e.g. changes, operation of the load based on the received operation control signal. Upon receiving a restoration control signal from the first group electric equipment that is recognizing the voice, the controller 230 controls, e.g. restores, operation of the load based on the received restoration control signal.

During controlling the operation of the load, the controller 230 directly receives a reduction rate from the first group electric equipment that is recognizing the voice to reduce an operation rate of the load by the received reduction rate.

In addition, the controller 230 may receive a noise reduction control signal from the first group electric equipment that is recognizing the voice, check a reduction rate stored in the storage unit 240, and reduces the operation rate of the load by the checked reduction rate.

Furthermore, the controller 230 further reduces the operation rate of the load whenever receiving the noise reduction control signal from the first group electric equipment that is recognizing the voice.

Upon receiving a noise level provision request signal from the first group electric equipment, the controller 230 checks a sound level of the load and transmits the checked sound level to the first group electric equipment.

Checking the sound level of the load may include checking the operation rate of the load 270 and checking a sound level corresponding to the checked operation rate or measuring a sound level using a sensor and checking the measured sound level.

The storage unit 240 stores information of the load, operation of which is to be controlled to reduce noise, and the operation rate of the load per operation mode.

That is, the storage unit 240 stores the operation rate of the load before the noise reduction control signal is input.

The storage unit 240 may store a reduction rate corresponding to the number of times of receiving the noise reduction control signal. That is, the storage unit 240 may store a reduction rate to reduce the operation rate whenever the noise reduction control signal is input from the first group electric equipment.

The storage unit 240 may store a sound level corresponding to the operation rate of the load generating noise.

The display unit 250 displays operation information of the electric equipment. When the operation is changed by the first group electric equipment, the display unit 250 displays operation change information.

The display unit 250 may constitute a touchscreen together with the input unit.

The drive unit 260 drives the load 270 according to a command of the controller 230.

The load 270 is a component provided in the third electric equipment to perform unique and additional functions of the third electric equipment. In this embodiment, a component generating noise among a plurality of components is an object to be controlled.

For example, in a case in which the third electric equipment is a kitchen hood, the load includes a sensor and a fan. In this embodiment, the fan generating noise is an object to be controlled.

On the other hand, in a case in which the fourth electric equipment is a cleaning robot, loads includes a wheel motor, a brush motor, and a fan. In this embodiment, the fan generating noise is an object to be controlled.

Meanwhile, the third electric equipment may further include a sensor to measure noise generated by the third electric equipment.

Hereinafter, a control method of the electric equipment will be described.

Figure 5:
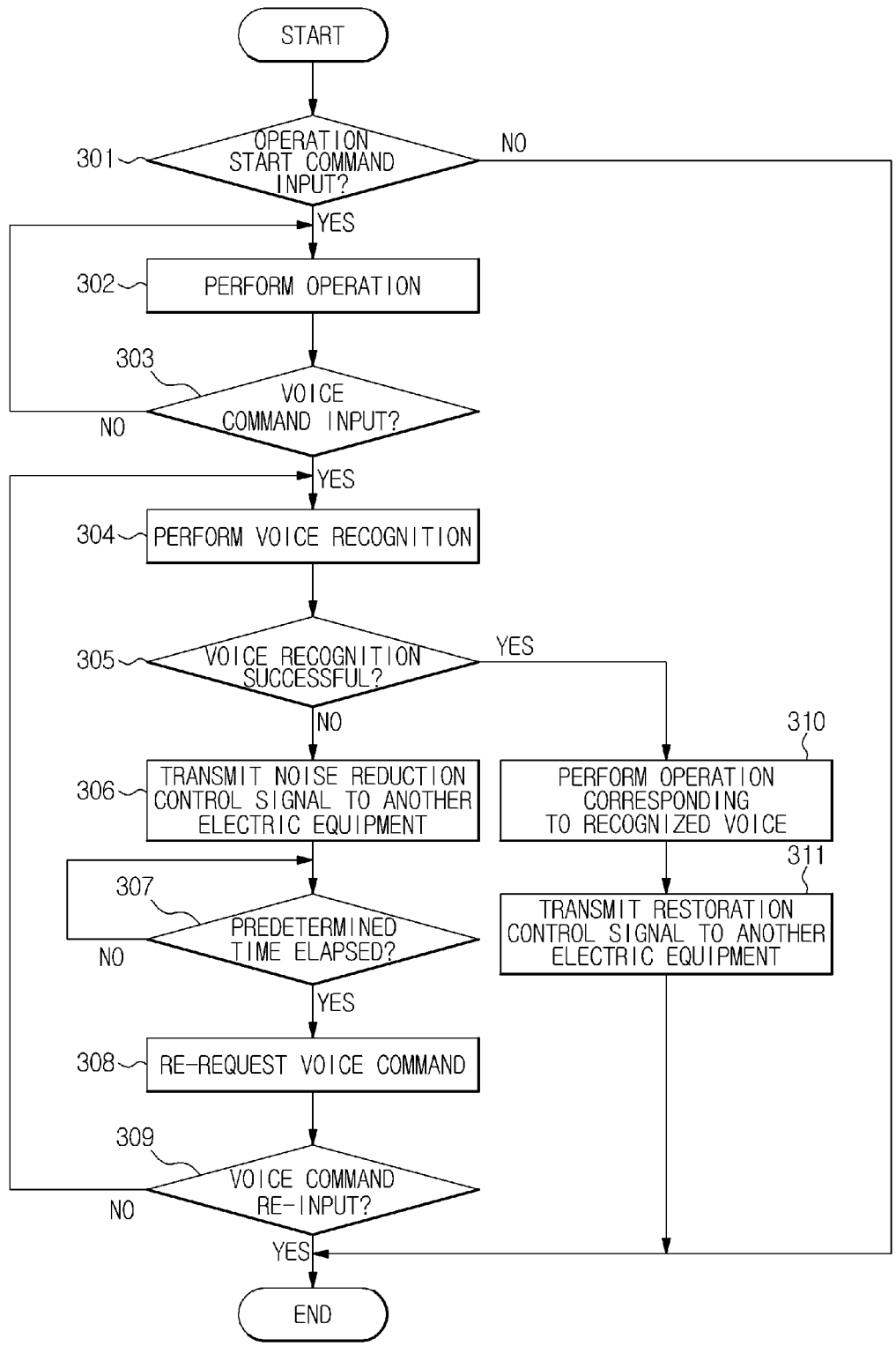
FIG. 5 is a control flowchart of the electric equipment belonging to the first group according to the embodiment of the present disclosure.

FIG. 5 is a control flowchart of the electric equipment belonging to the first group according to the embodiment of the present disclosure.

A plurality of electric equipments connected through the network 10 includes an air conditioner, a television, a cleaner, and a kitchen hood. Among these electric equipments, electric equipments that recognize a voice and operate based on the recognized voice include a first electric equipment and a second electric equipment and electric equipments that do not perform voice recognition include a third electric equipment and a fourth electric equipment.

Hereinafter, an air conditioner 100a will be described as the first electric equipment, a television 100b will be described as the second electric equipment, a cleaning robot 200a will be described as the third electric equipment, and a kitchen hood 200b will be described as the fourth electric equipment.

The first electric equipment, i.e. the air conditioner 100a, determines whether power is turned on or an operation start command is input in a standby state through the input unit 110 (301).

That is, when the operation start command is input through the input unit 100 or a voice, the air conditioner 100a operates loads, such as a compressor, various values, and a fan, to start operation (302).

At the time of starting the operation, the air conditioner operates the loads based on a previous operation mode. The operation mode includes information, such as a target room temperature, a wind direction, and a wind velocity.

Subsequently, the air conditioner determines whether an operation command has been input.

Upon determining that the operation command has been input through the input unit 110, the air conditioner changes the operation mode based on the input information.

In addition, upon determining that a voice command to change the current operation mode has been input (303), the air conditioner performs voice recognition (304).

Inputting the operation command through a voice is inputting an operation command word. The operation command word includes a magic word (for example, high air conditioner) to enter a voice recognition mode and a control word to change the operation mode.

The air conditioner determines whether the recognized voice information is not a magic word of another electric equipment but a magic word of the air conditioner. Upon determining that the recognized voice information is the magic word of the air conditioner, the air conditioner controls operation of at least one of the first and second group electric equipments.

That is, upon recognizing the magic word, the air conditioner determines that the air conditioner has entered the voice recognition mode and determines whether other first and second group electric equipments connected through the network are operating.

Subsequently, the air conditioner transmits a noise reduction control signal to at least one electric equipment that is operating to reduce noise generated by the at least one electric equipment that is operating. At this time, the air conditioner commands the at least one electric equipment that is operating to reduce an operation rate.

For example, in a case in which the television, which is one of the first group electric equipments, is operating, the cleaning robot, which is one of the second group electric equipments, is operating, and the kitchen hood, which is another second group electric equipment, is not operating, the air conditioner controls operation of at least one selected from between the television and the cleaning robot.

In addition, at the time of performing voice recognition, the air conditioner may determine success probability of the voice recognition before controlling operation of at least one electric equipment that is operating and determine successability of the voice recognition based on the determined success probability (305) and further transmit a noise reduction control signal to another electric equipment based on the successability of the voice recognition (306) to control the operation of the another electric equipment step by step.

That is, the air conditioner may determine successability in which the word intended by the user is correctly recognized and control operation of at least one electric equipment step by step according to the determination result to increase a recognition rate of a control word which will be subsequently recognized, thereby correctly recognizing the operation command intended by the user.

Determining successability in which the voice is recognized as the magic word is determining a possibility in which the voce recognized as the magic word is implemented as a real magic word. A level of collected sound during voice recognition or a voice recognition rate during voice recognition is referred to.

More specifically, at the time of recognizing a magic word, the air conditioner checks a level of collected sound and compares the checked level of the collected sound with a reference sound level. When the checked level of the collected sound is equal to or greater than the reference sound level, the air conditioner controls operation of at least one electric equipment that is operating. When the checked level of the collected sound is less than the reference sound level, the air conditioner determines that success probability of the voice recognition is high and maintains operation of at least one electric equipment that is operating.

In addition, at the time of recognizing a magic word, the air conditioner checks a recognition rate of the magic word and compares the checked recognition rate of the magic word with a reference recognition rate. When the checked recognition rate of the magic word is equal to or less than the reference recognition rate, the air conditioner controls operation of at least one electric equipment that is operating.

When the checked recognition rate of the magic word is greater than the reference recognition rate, the air conditioner determines that success probability of the voice recognition is high and maintains operation of at least one electric equipment that is operating.

Furthermore, at the time of recognizing a control word input after recognition of the magic word, the air conditioner may control an operation rate of at least one electric equipment that is operating based on the sound level or the recognition rate of the voice.

Subsequently, when a predetermined time elapses after transmission of the noise reduction control signal to at least one electric equipment that is operating (307), the air conditioner re-requests a voice command from the user (308). This may be output as sound or through the display unit.

Subsequently, when the voice command is re-input (309), the air conditioner re-performs voice recognition and repeats a process of controlling operation of at least one electric equipment that is operating based on success probability of the voice recognition.

As described above, the air conditioner may control operation of at least one electric equipment that is operating only when an operation command is first input through a voice or control operation of at least one electric equipment that is operating step by step until the operation command input through the voice is clearly recognized.

On the other hand, upon determining that successability of the voice recognition of the voice command, the air conditioner changes an operation mode based on the recognized voice information and operates the load based on the changed operation mode (310). At this time, the air conditioner controls operation of the load based on the changed operation mode.

Subsequently, when the voice command has been successfully recognized, the air conditioner transmits a restoration control signal to at least one electric equipment the operation of which has been changed (311).

Hereinafter, an operation control configuration to control operation of at least one electric equipment that is operating will be described with reference to FIGS. 6 to 9.

An example will be described with reference to FIG. 6.

Upon determining that a magic word has been recognized, the air conditioner determines electric equipments that are operating among the electric equipments connected through the network and controls operation of the determined electric equipments. At this time, the air conditioner transmits a noise reduction control signal to the electric equipments that are operating. The noise reduction control signal includes a reduction rate of an operation rate to reduce noise.

In addition, the air conditioner may control only electric equipments having loads generating noise among the electric equipments that are operating. Information about the electric equipments having loads generating noise having the load generating noise is prestored in the air conditioner.

For example, in a case in which the television, which is one of the first group electric equipments, is operating, the cleaning robot, which is one of the second group electric equipments, is operating, and the kitchen hood, which is another second group electric equipment, is not operating, the air conditioner controls operation of the television and the cleaning robot. At this time, the air conditioner reduces an operation rate of the speaker, which is the load generating noise, in the television by a predetermined reduction rate. In addition, the air conditioner reduces an operation rate of the fan and the brush motor, which are the loads generating noise, in the cleaning robot by the predetermined reduction rate.

On the assumption that the operation rate of the speaker of the television is 100%, the operation rate of the fan and the brush motor of the cleaning robot is 100%, and the predetermined reduction rate is 50%, reducing the operation rate of the load by the predetermined reduction rate includes reducing the operation rate of the speaker by 50% such that the speaker of the television operates at an operation rate of 50% to turn down the volume by 50% and reducing the operation rate of the fan and the brush motor by 50% such that the fan and the brush motor operate at an operation rate of 50% to reduce performance of the cleaning robot by 50%.

Another example will be described with reference to FIG. 7.

Upon determining that a magic word has been recognized, the air conditioner determines electric equipments that are operating among the electric equipments connected through the network and transmits a noise reduction control signal to the determined electric equipments. The noise reduction control signal includes a first reduction rate to reduce noise.

For example, in a case in which the television, which is one of the first group electric equipments, is operating, the cleaning robot, which is one of the second group electric equipments, is operating, and the kitchen hood, which is another second group electric equipment, is not operating, the air conditioner controls operation of the television and the cleaning robot. At this time, the air conditioner reduces an operation rate of the speaker, which is the load generating noise, in the television by a first reduction rate. In addition, the air conditioner reduces an operation rate of the fan and the brush motor, which are the loads generating noise, in the cleaning robot by the first reduction rate.

Subsequently, the air conditioner re-requests a voice command from a user. Upon determining that the voice command has been re-input, the air conditioner determines electric equipments that are operating among the electric equipments connected through the network and transmits a noise reduction control signal to the determined electric equipments. The noise reduction control signal includes a second reduction rate to reduce noise.

For example, in a case in which the television, which is one of the first group electric equipments, is operating, the cleaning robot, which is one of the second group electric equipments, is operating, and the kitchen hood, which is another second group electric equipment, is not operating, the air conditioner controls operation of the television and the cleaning robot. At this time, the air conditioner further reduces an operation rate of the speaker, which is the load generating noise, in the television by a second reduction rate in a state in which the operation rate of the speaker is reduced by the first reduction rate. In addition, the air conditioner further reduces an operation rate of the fan and the brush motor, which are the loads generating noise, in the cleaning robot by the second reduction rate in a state in which the operation rate of the fan and the brush motor is reduced by the first reduction rate.

The first reduction rate and the second reduction rate may be the same as or different from each other. A case in which the first reduction rate and the second reduction rate are different from each other will be described by way of example.

On the assumption that the first reduction rate is 30% and the second reduction rate is 25%, the operation rate of the speaker of the television is reduced by 30% in a state in which the operation rate of the speaker of the television is 100% such that the speaker of the television operates at an operation rate of 70% and the operation rate of the speaker of the television is further reduced by 25% in a state in which the operation rate of the speaker of the television is 70% such that the speaker of the television operates at an operation rate of 52.5%.

In addition, on the assumption that the first reduction rate is 30% and the second reduction rate is 25%, the operation rate of the fan and the brush motor of the cleaning robot is reduced by 30% in a state in which the operation rate of the fan and the brush motor of the cleaning robot is 100% such that the fan and the brush motor of the cleaning robot operate at an operation rate of 70% and the operation rate of the fan and the brush motor of the cleaning robot is further reduced by 25% in a state in which the fan and the brush motor of the cleaning robot is 70% such that the fan and the brush motor of the cleaning robot operate at an operation rate of 52.5%.

In this way, the air conditioner re-requests a voice command from the user in a state in which noise of the cleaning robot and the television is reduced and further controls operation of the electric equipments that are operating until the re-input voice command is successfully recognized.

That is, the air conditioner continuously reduces operation rates of the electric equipments that are operating whenever the voice command is input. In addition, the air conditioner reduces the operation rates of the electric equipments that are operating by an n-th reduction rate for n-th reduction and turns off all the electric equipments at the last operation.

Another example will be described with reference to FIG. 8.

Upon determining that a magic word has been recognized, the air conditioner determines electric equipments that are operating among the electric equipments connected through the network and checks noise levels of the determined electric equipments to calculate an average sound level.

The air conditioner compares the average sound level with a predetermined target sound level. When the average sound level is greater than the target sound level, the air conditioner checks electric equipments having sound levels greater than the target sound level and controls operation of the checked electric equipments. When the average sound level is less than the target sound level, the air conditioner maintains operation of the electric equipments.

During controlling operation of the electric equipments having noise levels greater than the target sound level, the air conditioner compares the sound levels of the electric equipments with the target sound level to calculate a level difference per electric equipment, calculates a reduction rate per electric equipment based on the calculated level difference per electric equipment and the sound levels of the electric equipments, and transmits the calculated reduction rate per electric equipment to the respective electric equipments as an operation control signal.

The above case will be described by way of example.

It is assumed that the target sound level is 60, the noise level of the television is 50, the noise level of the cleaning robot is 80, and the noise level of the kitchen hood is 75.

The air conditioner sums the noise level 50 of the television 50, the noise level 80 of the cleaning robot, and the noise level 75 of the kitchen hood to calculate an average noise level. At this time, the average noise level is 70.

The air conditioner compares the average noise level 70 with the target sound level 60. Since the average noise level is higher than the target sound level, the air conditioner determines that success probability of the voice recognition is low.

Accordingly, the air conditioner controls operation of the electric equipments that are operating. At this time, the air conditioner controls only operation of the cleaning robot and the kitchen hood having noise levels higher than the target sound level 60.

The air conditioner calculates a reduction rate to control the cleaning robot and a reduction rate to control the kitchen hood.

That is, the reduction rate to control the cleaning robot is acquired as follows. The noise level 80 of the cleaning robot is compared with the target sound level 60 to acquire a level difference 20 and a reduction rate to reduce the acquired level difference 20 is acquired. At this time, the reduction rate to reduce the level difference 20 is 25%.

The reduction rate to control the kitchen hood is acquired as follows. The noise level 75 of the kitchen hood is compared with the target sound level 60 to acquire a level difference 15 and a reduction rate to reduce the acquired level difference 15 is acquired. At this time, the reduction rate to reduce the level difference 15 is 20%.

Consequently, the air conditioner maintains operation of the television since the noise level of the television is lower than the target sound level, reduces the operation rate of the cleaning robot by 25%, and reduces the operation rate of the kitchen hood by 20%. As a result, the noise level generated from the cleaning robot and the noise level generated from the kitchen hood becomes 60.

Another example will be described with reference to FIG. 9.

Upon determining that a magic word has been recognized, the air conditioner determines electric equipments that are operating among the electric equipments connected through the network and checks noise levels of the determined electric equipments to calculate an average sound level.

The air conditioner compares the average sound level with a predetermined target sound level. When the average sound level is greater than the target sound level, the air conditioner checks electric equipments having sound levels greater than the target sound level and controls operation of the checked electric equipments. When the average sound level is less than the target sound level, the air conditioner maintains operation of the electric equipments.

During controlling operation of the electric equipments having noise levels greater than the target sound level, the air conditioner compares the sound levels of the electric equipments with the target sound level to calculate a level difference per the electric equipment, calculates a reduction rate per electric equipment based on the calculated a level difference per electric equipment and the sound levels of the electric equipments, and transmits the calculated reduction rate per electric equipment to the respective electric equipments as an operation control signal.

Subsequently, the air conditioner re-requests a voice command from a user. Upon determining that the voice command has been re-input, the air conditioner determines electric equipments that are operating among the electric equipments connected through the network and further transmits a noise reduction control signal to the determined electric equipments.

At this time, the air conditioner transmits a predetermined reduction rate to the television, the cleaning robot, and the kitchen hood that are operating.

For example, on the assumption that the reduction rate is 5%, the air conditioner reduces the operation rate of the television by 5%, reduces the operation rate of the kitchen hood by 20% and then further reduces the operation rate of the kitchen hood by 5%, and reduces the operation rate of the cleaning robot by 25% and then further reduces the operation rate of the cleaning robot by 5%.

Subsequently, the air conditioner re-requests a voice command from the user and further reduces the operation rates of the electric equipments that are operating by the predetermined reduction rate until the re-input voice command is successfully recognized.

In the above, the operation rates of the electric equipments are reduced by the same reduction rate. Alternatively, the operation rates of the electric equipments may be reduced by different reduction rates.

Another example will be described.

Upon determining that a magic word has been recognized, the air conditioner determines electric equipments that are operating among the electric equipments connected through the network, checks priority of the determined electric equipments, and controls operation of the electric equipments based on the checked priority.

At this time, the air conditioner controls operation of an electric equipment having the highest priority.

For example, in a case in which priority is set in order of the cleaning robot, the television, the kitchen hood, and the air conditioner, the air conditioner determines an electric equipment having the highest priority excluding the air conditioner. In this case, the electric equipment having the highest priority is the cleaning robot. The air conditioner controls an operation rate of the cleaning robot based on a predetermined reduction rate, controls an operation rate of a load generating noise to be lowered to from 100% through 0%, or temporarily stops operation of the cleaning robot.

The priority of the electric equipments may be decided in order of a sound level during operation.

Another example will be described.

Upon determining that a magic word has been recognized, the air conditioner determines electric equipments that are operating among the electric equipments connected through the network, checks priority of the determined electric equipments, and controls operation of the electric equipments based on the checked priority.

At this time, the air conditioner controls operation of an electric equipment having the highest priority and re-requests a voice command from a user. Upon determining that the voice command has been re-input, the air conditioner checks an electric equipment having second priority among the electric equipments that are operating and controls, e.g. reduces, noise of the checked electric equipment.

For example, in a case in which priority is set in order of the cleaning robot, the television, the kitchen hood, and the air conditioner, the air conditioner determines an electric equipment having the highest priority excluding the air conditioner. The air conditioner controls operation of the cleaning robot, which has the highest priority, and then controls operation of the television.

The air conditioner re-requests a voice command from a user and repeats a process of controlling operation of an electric equipment having the next priority until the re-input voice command is successfully recognized.

Controlling operation of an electric equipment include reducing an operation rate of a load generating noise or temporarily stopping operation of the load generating noise.

A further example will be described.

Upon determining that a magic word has been recognized, the air conditioner determines electric equipments that are operating among the electric equipments connected through the network, checks priority of the determined electric equipments, and controls operation of the electric equipments based on the checked priority.

The air conditioner controls operation of an electric equipment having the highest priority. At this time, the air conditioner reduces an operation rate of the electric equipment having the highest priority by a predetermined reduction rate.

The air conditioner controls operation of the electric equipment having the highest priority and re-requests a voice command from a user. Upon determining that the voice command has been re-input, the air conditioner further reduces the operation rate of the electric equipment having the highest priority.

That is, the air conditioner re-requests a voice command from a user and repeats a process of further reducing the operation rate of the electric equipment having the highest priority until the re-input voice command is successfully recognized.

For example, on the assumption that the electric equipment having the highest priority is a cleaning robot, the air conditioner reduces a rotational velocity of a fan of the cleaning robot, which is a load generating noise, to 80%, reduces the rotational velocity of a fan of the cleaning robot to 60% when a second voice command is input, and reduces the rotational velocity of a fan of the cleaning robot to 40% when a third voice command is input.

Figure 10:
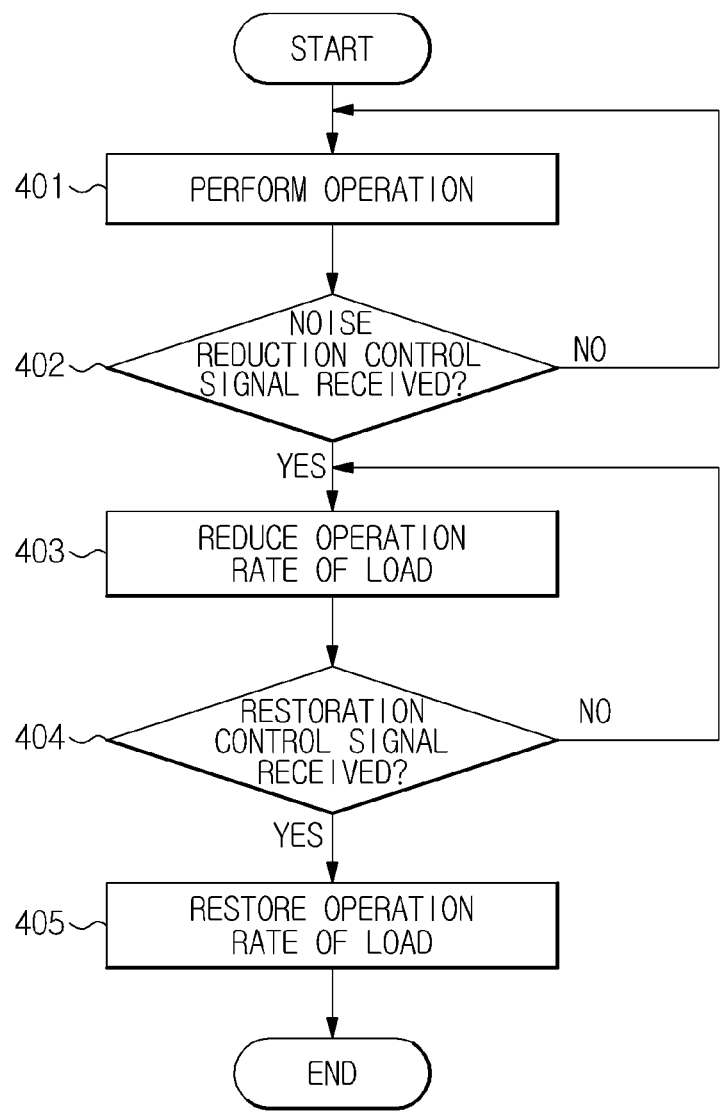
FIG. 10 is a control flowchart of an electric equipment receiving a control command from another electric equipment performing voice recognition according to a further embodiment of the present disclosure.

FIG. 10 is a control flowchart of an electric equipment receiving a control command from another electric equipment performing voice recognition according to a further embodiment of the present disclosure.

The electric equipment receiving the control command from the electric equipment performing voice recognition may be a first group electric equipment or a second group electric equipment.

In this embodiment, a cleaning robot, which is a second group electric equipment, will be described by way of example.

Upon receiving a cleaning command from a user, the cleaning robot performs a cleaning operation (401).

The cleaning robot operates various loads provided therein to perform cleaning while traveling in the home. At this time, the cleaning robot checks an operation rate of each load corresponding to an operation mode and operates each load based on the checked operation rate.

Upon receiving a noise reduction control signal from a first group electric equipment during cleaning (402), the cleaning robot reduces the operation rate of each load generating noise (403).

For example, the cleaning robot includes a fan, a brush motor, and a wheel motor as the loads generating noise. The cleaning robot reduces the operation rate of at least one selected from among the fan, the brush motor, and the wheel motor.

The cleaning robot may directly receive a reduction rate to reduce the operation rate of each load from an electric equipment performing voice recognition or may decide the reduction rate based on the number of times of receiving the noise reduction control signal from the electric equipment performing voice recognition.

Subsequently, upon receiving a restoration control signal from the electric equipment performing voice recognition while the cleaning robot performs cleaning in a state in which the operation of the load generating noise is reduced (404), the cleaning robot restores the reduced operation rate of the load to the operation rate when cleaning was initially performed (405).

Subsequently, the cleaning robot performs cleaning while traveling in the home at the restored operation rate.

In a case in which the cleaning robot is capable of recognizing a voice, when a magic word is recognized, the cleaning robot may determine whether the recognized magic word is prestored. Upon determining that the recognized magic word is not prestored, i.e. the recognized magic word is for another electric equipment, the cleaning robot may perform cleaning without entering a voice recognition mode.

As is apparent from the above description, according to an aspect of the present disclosure, voice recognition is performed in a state in which surrounding noise is reduced, thereby improving performance of the voice recognition and thus improving operational accuracy of an electric equipment.

In addition, a voice recognition rate is increased, thereby improving user satisfaction.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electric equipment comprising:
    a communication unit configured to communicate with a plurality of other electric equipments in a predetermined space through a network;
    a sound collection unit configured to collect sound in the predetermined space;
    a voice recognition unit configured to recognize a voice from the collected sound; and
    a controller configured to transmit a noise reduction control signal to at least one other electric equipment of the plurality of the other electric equipments when the recognized voice is an operation command,
    wherein the controller is configured to reduce an operation rate of the at least one other electric equipment until a level of sound around the sound collection unit of the electric equipment is less than a reference sound level, and
    wherein the controller requests noise levels from the plurality of the other electric equipments, and when the noise levels are received, identify the at least one other electric equipment having a noise level greater than a target noise level among the plurality of the other electric equipments, and transmits the noise reduction control signal to reduce operation rates of the identified at least one other electric equipment.

2. The electric equipment according to claim 1, wherein the operation command comprises a magic word indicating a start of voice recognition.

3. The electric equipment according to claim 1, wherein the operation command comprises a control word to manipulate a current operation mode.

4. The electric equipment according to claim 1, wherein the controller controls an operation rate of 100% through 0% of the at least one other electric equipment.

5. The electric equipment according to claim 1, wherein the controller reduces the operation rate of the at least one other electric equipment by a predetermined reduction rate.

6. The electric equipment according to claim 5, wherein the controller reduces the operation rate of the at least one other electric equipment step by step until a recognition rate of the voice by the voice recognition unit is greater than a reference recognition rate.

7. The electric equipment according to claim 5,
    wherein to identify the at least one other electric equipment, the controller checks electric equipments among the plurality of electric equipments that are operating, requests noise levels from the checked electric equipments, averages the received noise levels of the checked electric equipments to calculate an average noise level, and, compares the calculated average noise level with the target noise level.

8. The electric equipment according to claim 7, wherein the controller reduces the operation rates of the electric equipments that are operating by a predetermined reduction rate when a recognition rate of the voice is equal to or less than a reference recognition rate.

9. The electric equipment according to claim 1, wherein the controller transmits a restoration control signal to the at least one other electric equipment when a recognition rate by the recognition unit of the voice is greater than a reference recognition rate.

10. An electric equipment comprising:
a load generating a noise while the electric equipment is operating;
a communication unit configured to communicate with an other electric equipment performing voice recognition through a network; and
a controller to reduce an operation rate of the load generating the noise upon receiving a noise reduction control signal from the other electric equipment performing voice recognition,
wherein the controller is configured to reduce an operation rate of the electric equipment until a level of sound around a sound collection unit of the other electric equipment is less than a reference sound level, and
wherein when a noise level provision request signal is received, the controller checks the noise level of the load, transmits the checked noise level to the other electric equipment, compares the checked noise level with a target noise level upon receiving the noise reduction control signal from the other electric equipment, and controls the operation rate of the load, when the noise level is greater than the target noise level.

11. The electric equipment according to claim 10, wherein the noise reduction control signal comprises a reduction rate to reduce the operation rate of the load.

12. The electric equipment according to claim 10, further comprising:
a sound collection unit configured to collect sound in a predetermined space; and
a voice recognition unit configured to recognize a voice from the collected sound, wherein
when the recognized voice is an operation command, the controller controls operation of the load in response to the operation command.

13. The electric equipment according to claim 10, further comprising a storage unit to store a reduction rate corresponding to the number of times of receiving the noise reduction control signal.

14. The electric equipment according to claim 10, wherein the load comprises any one selected from between a fan and a speaker.

15. The electric equipment according to claim 10, further comprising:
a storage unit to store an operation rate of the load during operation before the noise reduction control signal is received, wherein
the controller restores the operation rate of the load upon receiving a restoration control signal from the other electric equipment performing voice recognition.

16. A control method of an electric equipment communicating with a plurality of other electric equipments in a predetermined space through a network, the control method comprising:
collecting sound in the predetermined space;
recognizing a voice from the collected sound;
transmitting a noise reduction control signal to at least one other electric equipment of the plurality of the other electric equipments when the recognized voice is an operation command;
outputting information to re-request the voice command;
recollecting sound in the predetermined space;
re-recognizing a voice from the recollected sound;
reducing an operation rate of the at least one other electric equipment until a level of sound around a sound collection unit of the electric equipment is less than a reference sound level; and
when the re-recognized voice is an operation command, performing an operation corresponding to the operation command,
wherein the transmitting the noise reduction control signal to the at least one other electric equipment comprises:
requesting noise levels from the plurality of other electric equipments,
identifying the at least one other electric equipment having a noise level greater than a target noise level among the plurality of other electric equipments, when the noise levels are received, and
transmitting the noise reduction control signal to reduce operation rates of the identified at least one other electric equipment.

17. The control method according to claim 16, wherein the recognizing the voice from the collected sound comprises recognizing a magic word indicating a start of voice recognition.

18. The control method according to claim 16, wherein the re-recognizing the voice from the recollected sound comprises recognizing a control word to manipulate a current operation mode.

19. The control method according to claim 16, wherein the transmitting the noise reduction control signal to the at least one other electric equipment comprises transmitting a reduction control signal for an operation rate of 100% through 0% to the at least one other electric equipment.

20. The control method according to claim 16, wherein the transmitting the noise reduction control signal to the at least one other electric equipment comprises transmitting a reduction rate reduction control signal to the at least one other electric equipment.

21. The control method according to claim 16, wherein the transmitting the noise reduction control signal to the at least one other electric equipment comprises:
checking a level of sound around the sound collection unit; and
transmitting the noise reduction control signal when the checked sound level is equal to or greater than a reference sound level.

22. The control method according to claim 21, further comprising:
checking a level of the recollected sound;
transmitting an operation reduction rate to the noise reduction control signal when the checked sound level is equal to or greater than the reference sound level; and
outputting information to re-request the voice command.

23. The control method according to claim 22, wherein the transmitting the operation reduction rate to the noise reduction control signal comprises:

outputting information to re-request the voice command until the checked sound level is less than the reference sound level; and reducing the operation rate of the at least one other electric equipment step by step based on the number of times of re-requesting the voice command.

24. The control method according to claim 16, wherein the transmitting the noise reduction control signal to the at least one other electric equipment comprises:

checking whether a recognition rate of the voice is equal to or less than a reference recognition rate; and transmitting the noise reduction control signal when the recognition rate of the voice is equal to or less than the reference recognition rate.

25. The control method according to claim 24, further comprising:

checking a recognition rate of the re-recognized voice;

transmitting an operation reduction rate to the noise reduction control signal when the checked recognition rate is equal to or less than the reference recognition rate; and outputting information to re-request the voice command.

26. The control method according to claim 25, wherein the transmitting the operation reduction rate to the noise reduction control signal comprises:

outputting information to re-request the voice command until the checked recognition rate is greater than the reference recognition rate; and reducing the operation rate of the at least one other electric equipment step by step based on the number of times of re-requesting the voice command.

27. The control method according to claim 16, wherein the identifying the at least one other electric equipment having the noise level greater than a target noise level among the plurality of other electric equipments comprises:

averaging the received noise levels of the plurality of the other electric equipments to calculate an average noise level; and comparing the calculated average noise level with the target noise level, wherein the plurality of the other electric equipments includes other electric equipments that are operating.

28. The control method according to claim 27, further comprising reducing the operation rates of the electric equipments that are operating by a predetermined reduction rate when a recognition rate of the voice is equal to or less than a reference recognition rate.

29. The control method according to claim 16, further comprising transmitting a restoration control signal to the at least one other electric equipment when a recognition rate of the voice is greater than a reference recognition rate.

30. A control method of an electric equipment communicating with an other electric equipment performing voice recognition through a network, the control method comprising:

operating a load when an operation command is input;

reducing an operation rate of the load upon receiving a noise reduction control signal from the other electric equipment performing voice recognition during operation of the load until a level of sound around a sound collection unit of the electric equipment is less than a reference sound level;

storing an operation rate of the load during operation before the noise reduction control signal is received;

restoring the operation rate of the load to the stored operation rate upon receiving a restoration control signal from the electric equipment performing voice recognition, wherein the reducing the operation rate of the load comprises:

checking a noise level of the load, comparing the checked noise level with a target noise level upon receiving the noise reduction control signal from the other electric equipment, and controlling the operation rate of the load, when the checked noise level is greater than the target noise level; and when a noise level provision request signal is received, transmitting the checked noise level to the other electric equipment.

31. The control method according to claim 30, wherein the noise reduction control signal comprises a reduction rate to reduce the operation rate of the load.

32. The control method according to claim 30, further comprising:

collecting sound in a predetermined space;

recognizing a voice from the collected sound; and when the recognized voice is an operation command, controlling operation of the load in response to the operation command.

33. The control method according to claim 30, wherein the reducing the operation rate of the load comprises:

checking the number of times of receiving the noise reduction control signal; and reducing the operation rate step by step in response to the checked number of times of receiving the noise reduction control signal.

34. The control method according to claim 33, wherein the reducing the operation rate step by step comprises varying reduction rates at the respective steps.

35. An electric equipment comprising:

a voice recognition unit configured to receive a voice command;

a controller configured to determine which of a plurality of electric equipments on a network are operating and to determine which operating electric equipments of the plurality of the electric equipments should receive a noise reduction control signal based on the voice command; and a communication unit configured to communicate with the plurality of electric equipment through the network and to transmit the noise reduction control signal to the determined operating electric equipments, wherein the controller configured to reduce an operation rate of the at least one other of the plurality of the electric equipments until a level of sound around a sound collection unit of the electric equipment is less than a reference sound level, and wherein the controller requests noise levels from the determined operating electric equipments, and when the noise levels are received, identify the at least one other electric equipment having noise levels greater than a target noise level among the determined operating electric equipments, transmits the noise reduction control signal to reduce operation rates of the identified at least one other electric equipment.

36. A voice recognition system comprising:

a first electric equipment;

a second electric equipment connected to the first electric equipment by way of a network, the second electric equipment configured to receive a voice command, to determine whether the first electric equipment is operating, to determine whether the first electric equipment and the second electric equipment should receive a noise reduction signal based on the voice command, and to perform at least one of transmitting the noise reduction signal to the first electric equipment and reducing noise on the second electric equipment by reducing an operation rate of the second electric equipment until a level of sound around a sound collection unit is less than a reference sound level, wherein the second electric equipment requests a noise level from the first electric equipment, and when the noise level is received, compares the noise level with a target noise level, and identify the operation rate of a load, when the noise level is greater than the target noise level, and wherein the first electric equipment, when a noise level provision request signal is received, checks the noise level of the load, transmits the checked noise level to the second equipment, and controls the operation rate of the load, when the noise level is greater than the target noise level.

\* \* \* \* \*